(12) United States Patent
Humphreys et al.

(10) Patent No.: US 6,731,913 B2
(45) Date of Patent: May 4, 2004

(54) ELASTOMERIC ENCLOSURE

(75) Inventors: Morris Humphreys, Saginaw, TX (US); Peter Lopez, Frisco, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/060,648

(22) Filed: Jan. 30, 2002

(65) Prior Publication Data

US 2003/0143961 A1 Jul. 31, 2003

(51) Int. Cl.[7] .................................................. H04B 1/38
(52) U.S. Cl. ................... 455/90.3; 455/347; 455/575.1; 361/600; 361/625; 361/752; 361/757; 379/433.01
(58) Field of Search ................ 455/90.3, 347, 455/550, 566, 575.1; 361/600, 625, 683, 686, 752, 757, 814; 379/433.01, 433.11

(56) References Cited

U.S. PATENT DOCUMENTS

| | | | | |
|---|---|---|---|---|
| 3,770,115 A | * | 11/1973 | Cannell | 206/508 |
| 4,834,259 A | * | 5/1989 | Kubis et al. | 220/359.2 |
| 5,587,701 A | * | 12/1996 | Hess | 340/541 |
| 5,613,237 A | * | 3/1997 | Bent et al. | 455/351 |
| 5,618,041 A | * | 4/1997 | Huang | 473/549 |
| 5,669,079 A | * | 9/1997 | Morgan | 2/414 |
| 6,187,514 B1 | * | 2/2001 | Kiyosawa et al. | 430/320 |
| 6,303,666 B1 | * | 10/2001 | Yorita et al. | 521/79 |
| 2001/0030856 A1 | * | 10/2001 | Wilson | 361/814 |
| 2001/0049292 A1 | * | 12/2001 | Strawn et al. | 455/550 |
| 2002/0027768 A1 | * | 3/2002 | Tseng et al. | 361/683 |
| 2002/0065054 A1 | * | 5/2002 | Humphreys et al. | 455/90 |
| 2002/0094838 A1 | * | 7/2002 | Wang | 455/550 |
| 2002/0132634 A1 | * | 9/2002 | Hiltunen | 455/550 |
| 2003/0012592 A1 | * | 1/2003 | Min | 400/490 |

* cited by examiner

Primary Examiner—William Trost
Assistant Examiner—James Ewart

(57) ABSTRACT

An enclosure for a portable electronic device such as a mobile telephone. The enclosure includes a cover made of an elastomer so that it can be stretched over the chassis containing the device's internal components. Raised keys formed on the elastomeric enclosure surface are marked according to their function. The marked key preferably forms a raised portion on the front of the device, that is, the front cover of the enclosure, and cause key pegs extending from the interior wall to close switches on the device's internal component assembly. Various structures formed in the elastomeric cover correspond with features of the chassis so as to tend to retain it in position.

19 Claims, 13 Drawing Sheets

ELASTOMERIC ENCLOSURE

The present invention relates generally to the field of mobile telephone construction, and more specifically to an elastomeric enclosure for a mobile electronic device.

BACKGROUND

Mobile telephones are ubiquitous in modern societies. Once owned and carried only by the affluent or persons in specialized occupations that both required and supplied them, mobile phones are now owned by the many, and sometimes even by the majority of a given population. And no longer are mobile telephones used by only a small segment of the population, but rather now by people of all ages and walks of life.

There are several reasons for this widespread use of mobile phones. The first, foremost, of course, is technology. The development of a cellular system of organizing radio traffic has made possible the subscribing of thousands of customers in a single metropolitan area. Improved multiplexing and modulation techniques have contributed to the ability to handle vast numbers of customers. Coverage has improved as well; that is, the amount of geographic area in which a mobile-system subscriber is within range of a network antenna. At the same time, the cost of the mobile telephone itself and of a subscription to a mobile communications network have fallen and made mobile phone use affordable. Improved technology has also led to the development of ever-smaller and easier-to-use phones. As such improvements in technology often do, rising mobile-phone popularity led to increasingly large markets, which in turn encouraged further innovation.

Some of these improvements, however, present new challenges as well. The small telephones force designers to economize the size and weight of protective casing components. In other words, to satisfy consumer demands for small and lightweight phones, the instruments' ability to absorb shock and resist deformation that might damage internal parts is compromised. In addition, mobile phones are increasingly being used in environments hostile to sophisticated electronic technology. Where in the past, a limited number of rather expensive phones having limited capabilities were mostly used by professionals, and then frequently from a fixed automobile installation. Other mobile phones were truly mobile, but carried about in the large protective cases necessary to carry them and their large batteries around. The small, lightweight, and relatively inexpensive phones of the present, however, are owned by customers from all walks of life, and with occupations or avocations that take them and their phone into industrial plants construction sites, and all manner of outdoor locations.

Yet the small, modern phones are often less, not more rugged, and at the same time less able to resist hazards like dust and dirt. Despite the availability of alternate materials, the enclosures for most modern mobile devices are constructed of a hard plastic material. In many ways, of course, hard plastic is well suited to this application. "Plastic" meaning thermoplastic-materials flow when heated to a certain temperature, and can therefore be molded into precise shapes that they retain when cooled. Non-metallic, they are relatively lightweight, non-conducting, and nonmagnetic, which recommends them for use in connection with portable electronic devices. "Hard" plastic materials resist any deformation at normal operating temperatures (those that human operators will tolerate). That is, they cannot be significantly bent or stretched without experiencing, plastic (permanent) deformation or failure. They are strong enough, however, that a substantial force is required to bring such failure about. To make up for the enclosure's lack of ability to absorb shock, a separate cover is sometimes used. While useful in some ways, such covers are often eschewed because they hinder the telephones convenient use and are inconvenient to carry and install.

Needed, then, is an improved design for enclosing the internal components of a mobile phone that is economical, ergonomic, and provides reasonable environmental protection while does not unduly increasing the size, weight, and ease of use of the device. The present invention provides just such an apparatus.

SUMMARY OF THE INVENTION

The present invention is directed to an improved enclosure for a mobile station, that is, a mobile phone or similar device. In one aspect, the enclosure includes a first cover that forms a recess for at least partially receiving the internal components of the mobile station. The first cover is preferably an elastomer or similar material, and stretches elastically when the internal components are installed. The first cover thus attempts to retain the internal components within the recess. A second cover may also be present to at least partially receive the internal components of the mobile station such that when installed, the first and second covers substantially enclose the internal components. Keys integrally formed with the first cover translate movement induced by user manipulation to corresponding switches on the enclosed internal-component assembly through extensions formed on or attached to the interior surface of the front cover. The enclosure may further include an outer band disposed outside of the first and second covers.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

The preferred embodiment of the present invention is an assembly for enclosing a mobile telephone, such as a cell phone. It is equally suitable, however, for other similar devices such as personal digital assistants (PDAs), Web-enabled phones, and the like. For convenience, these and like devices will herein be referred to generically as "mobile stations".

Figure 1:
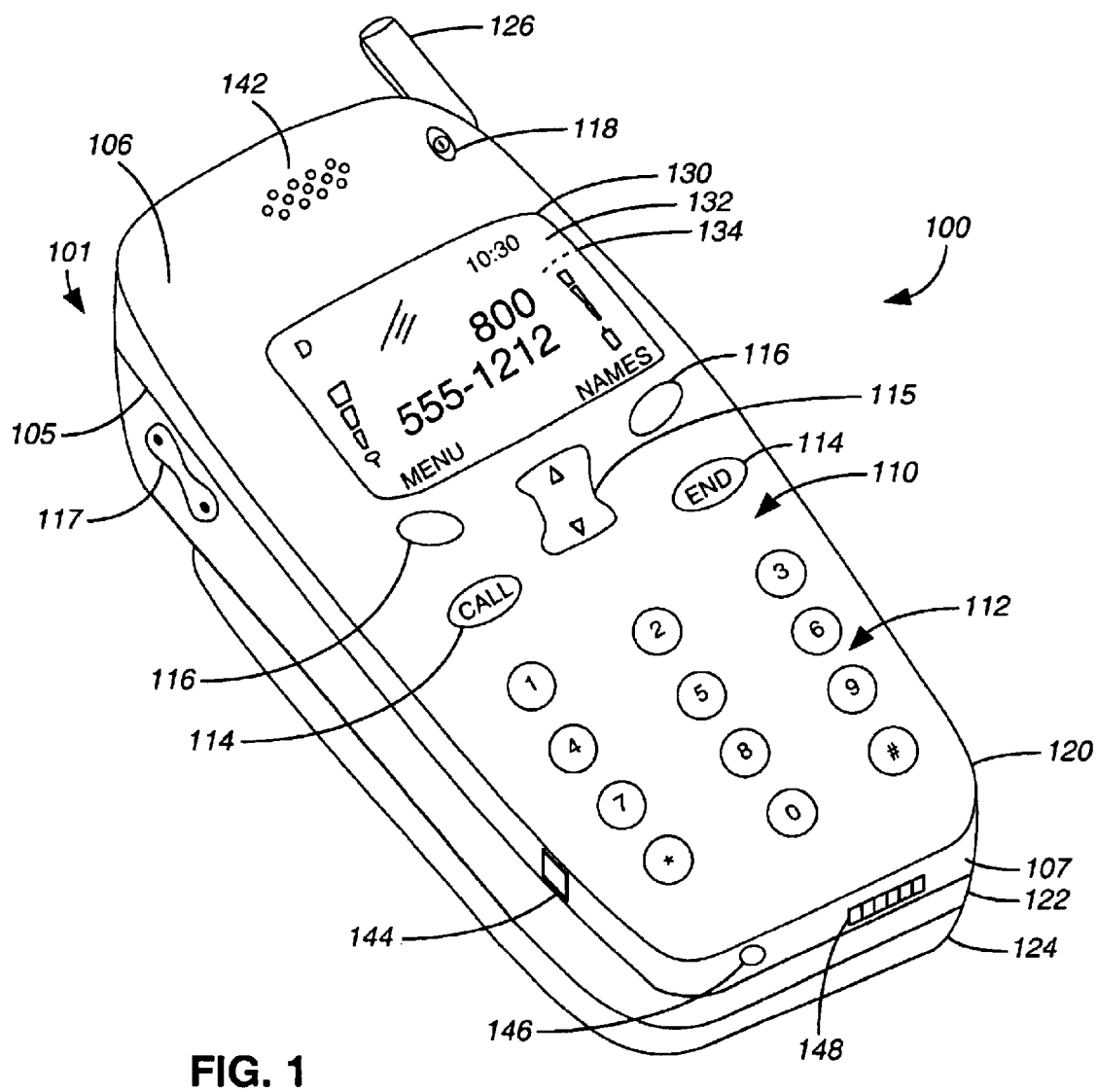
FIG. 1 is an exterior isometric view of a typical mobile station according to the prior art.

FIG. 1 is an exterior isometric view of a typical mobile station, in this case a mobile phone 100, according to the prior art. Mobile phone 100 is a radio telecommunication device for use in a cellular communication network. It contains a radio transmitter and receiver (not shown) for sending transmissions to nearby base stations that are in turn connected with the main network. The network itself naturally provides for intra-network communication, and also includes gateways through which other networks, such as the public-switched telephone network (PSTN) and the Internet may be accessed. Mobile station 100 is most often used for real-time voice communication, but can be used for short-message-system (SMS) messaging, data transmission, Web surfing, and paging services as well.

The internal circuitry and components (not shown) of mobile phone 100 are contained in a casing, or enclosure, that typically includes two or more sections, which will sometimes herein be referred to as covers. Referring to FIG. 1, mobile phone 100 has an enclosure 101 that includes front cover 120 and back cover 122, which are removably fastened together at joint 105 when the phone is assembled. Front cover 120 and back cover 122 are not normally taken apart except for maintenance by a service technician. Front cover 120 and back cover 122 are normally made of a hard plastic material, such as polycarbonate/ABS (PC/ABS). This material is strong enough to protect the telephone internals from reasonable shock encountered in ordinary operation and to resist penetration by objects that it may encounter when placed in a user's pocket, purse, or briefcase. Unfortunately, more severe shocks may result in fracturing the cover, and some strain will be transferred to the phone's internal components if caused by a strong enough force, such as when the phone is dropped.

Several openings are formed in enclosure 101 of mobile phone 100, with most, though not necessarily all of them present in front cover 120. The keypad 110 on face 106 of front cover 120 is a user interface including a plurality of openings, through which protrude keys such as alphanumeric keys 112, call control keys 114, scroll key 115 and function keys 116. As their names imply, these keys perform various duties in the phone's operation, with the alphanumeric keys 112 having a standard telephone keypad role, and the function and scroll keys used in connection with display 134. That is, the function of the function and scroll keys are variable and determined by the application state that the mobile phone is in, which is translated into a word or icon displayed next to the key on display 134.

Display 134 is typically a liquid crystal display (LCD) device. The LCD itself is protected by a plastic window pane 132, which is mounted to cover the display and protrude into window 130, an opening formed in front cover 120. As illustrated in FIG. 1, display 134 presents to the user such information as current function-key functions, telephone numbers, signal strength, and other information useful to the operation being performed. The protective window pane 132 is typically a component separate from the LCD, its chassis, and other portions of the internal assembly. Window pane is necessary because the components making up the LCD are fragile and subject to damage from even mild strikes.

Also formed in face 106 of front cover 120 is a small opening for power switch 118 and a plurality of small openings 142 that serve as a port for the speaker (not shown), which is mounted beneath them. At the opposite end of mobile station 100, microphone port 144 likewise permits entry of sound directed at the actual microphone (not shown) mounted inside. In the embodiment of FIG. 1, microphone port 144 is formed in the side of front cover 120, but could be formed anywhere proximate to the expected voice source, for example among alphanumeric keys 112 or on the bottom end 107 of front cover 120.

Located in the end 107 of front cover 120 are power port 146 for plugging in an external power adaptor and headphone port 148 for connecting an external headset and perhaps a microphone for hands-free operation. Power port 146 and headphone port 148 are receptacles for connecting (plugging in) an external appliance to the internal circuitry of mobile station 100. These receptacles are mounted within the mobile station's internal assembly (not shown) and are accessible from the outside through openings formed in end 107 of front cover 120. Note in this context that as used herein, the term "port" may refer to either a mere opening in the cover or an electrical connection mounted in an opening, with the distinction between these two types of port made only when necessary.

Back cover 122 frequently forms a recess (not shown) for receiving battery 124, to which it is removably attached during operation. In alternate versions, the battery may be received into an internal battery compartment and enclosed by the back cover or inserted into an opening in the back cover and protected or held in place by a separate battery cover. Also shown on back cover 122 is volume control 117, which, like the other keys, is accomplished by a key member protruding through an opening formed in the cover, in this case, back cover 122, that when manipulated by the user activates a switch located on the inner telephone assembly (not shown). Finally, radio transmission by the mobile station 100 shown in FIG. 1 is accomplished through use of antenna 126.

Figure 2:
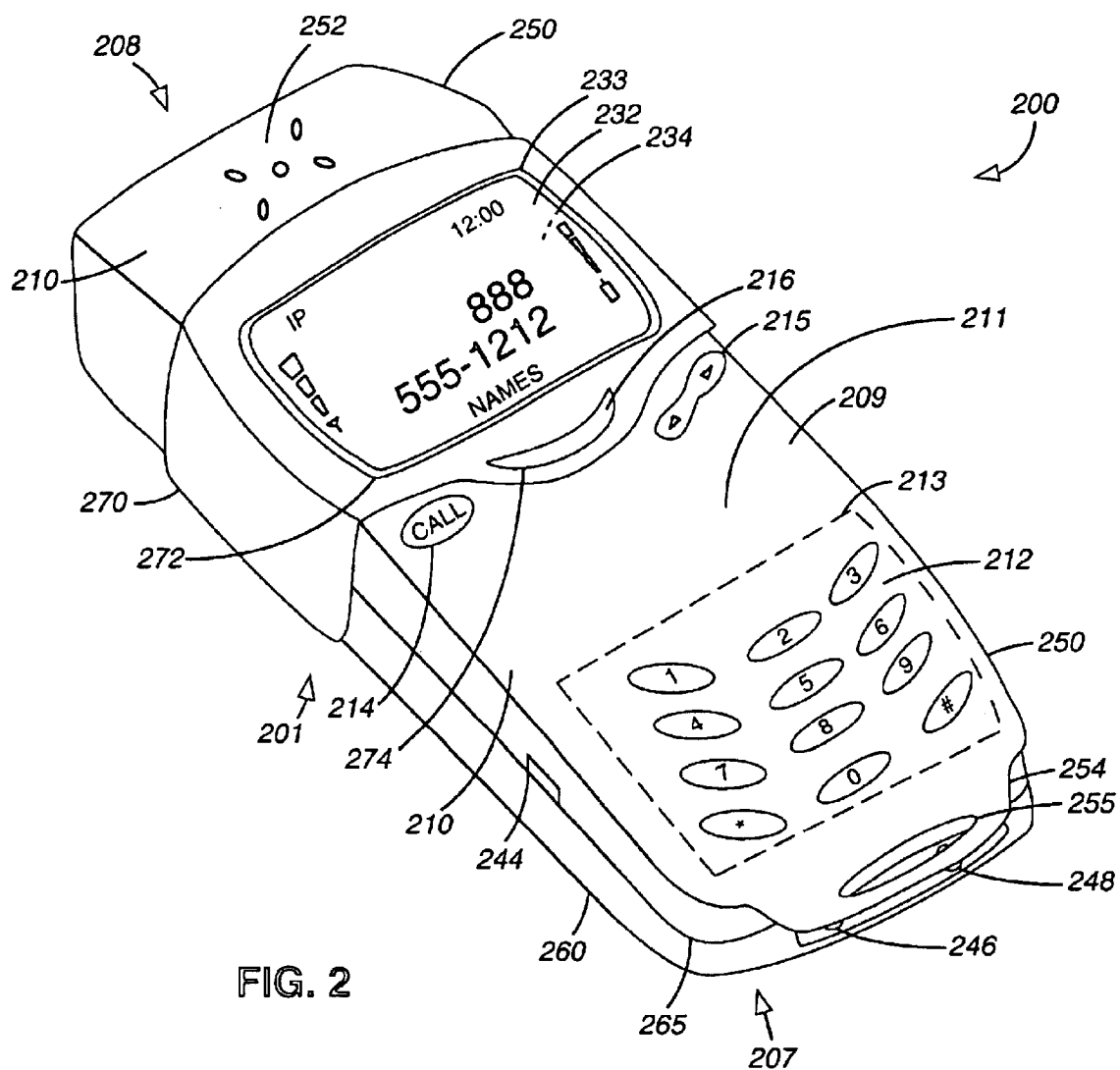
FIG. 2 is an exterior isometric view of a mobile station having an enclosure according to an embodiment of the present invention.

FIG. 2 is an exterior isometric view of a mobile station 200, in this embodiment also a mobile phone, having an enclosure 201 according to an embodiment of the present invention. As with the mobile station 100 of the prior art, enclosure 201 includes two or more covers that join together to enclose the mobile station's internal assembly (not shown in FIG. 2). The construction and configuration of enclosure 201, however, represents a substantial departure from the prior art design illustrated in FIG. 1. In accordance with the present invention, enclosure 201 includes primary cover 250, which is also shown separately in perspective views in FIGS. 3 to 6.

Primary cover 250 includes a front wall 210 having an external side, or face 209. Keypad 211 is found primarily (and in this embodiment, exclusively) on face 209. In this embodiment, the keys of keypad 211 are integrally formed with the cover 250 itself, as will be described in greater detail below. First, it should be noted that primary cover 250 is preferably made of an elastomeric material. An elastomer is a rubber-like material, natural or synthetic, that once molded has the ability to deform under the influence of force and regain its original shape when the force has been removed. Known elastomers include natural rubber, polyurethane, polyisoprene, and polybutadiene, but this list is intended to be illustrative rather than limiting. A thermoplastic urethane (TPU) is preferred because it resists picking up dirt and other debris. It is also injection-moldable and can be satisfactorily imprinted or bonded to films (such as print template 213 shown in FIGS. 2 and 13).

As mentioned above, in a preferred embodiment, keypad 210 is integrally formed with primary cover 250. Because of cover 250's elastomeric nature, keys activated by the user will typically return to their pre-activated position when the activating force is released. (This is not to say that in some embodiments, a spring or other device cannot be used to assist or speed the return of a key to its unactivated position.) For clarity, "key" or "keys" will herein refer to the primary user interface device that is activated by pushing or similar manipulation. Keypad 211 will, therefore, be a surface of the mobile station that normally comes into contact with the user during operation, though this is not necessarily the case. (For example, when there a protective screen is placed over the keys.) Understood in this definition is that an associated switch (or switches) located within the mobile station is, at approximately the same time, also activated, usually through movement translated mechanically from the pressed key to the switch. In a preferred embodiment of the present invention, the mechanical movement-translation means is a member extending from the key to the switch. See, for example, FIGS. 5, 7, and 9 for more detail. In a preferred embodiment, the keys of mobile station 200 are integrally-formed raised portions of primary cover 250. (Of course, other keys may be present in mobile station 200, as well.) Not only does raising the key area serve as a helpful textural indicator of the key's location, but may also prevent premature wearing of much-manipulated areas. In an alternate embodiment, however, the keys are even with the surrounding surface of cover 250, or may be depressed or given some other distinguishing texture.

In an alternate embodiment, the elastomeric primary cover 250 forms one or more openings where conventional keys (or key mat) may be fitted in a fashion similar to that found in the prior art. This configuration is not preferred, however, as the advantages of sealing and economy are thereby compromised. As should be apparent, the keys on a given instrument may be mixed in kind, that is, either integrally formed or not. In addition, it is pointed out that the keys precise number, function, and location is determined by design preference, not as a requirement of the present invention.

In the embodiment of FIG. 2, in fact, the keys present are deployed according to a standard organizational scheme. The alphanumeric keys 212 appear on the face 209 near the bottom end 207 of mobile station 200. The broken line surrounding alphanumeric keys 212 indicates the approximate location of key print template 213 (see also FIG. 13). Call control key 214 and volume control key 215 are also formed in face 210 of mobile station 200. Function key 216 is also found on face 209, but closer to display 234 where its current function is displayed. Speaker port 252 includes one or more openings formed in face 209 near the top end 208 of mobile station 200. Speaker port 252 permits the efficient passage of sound generated by a speaker (not shown) mounted underneath; microphone port 244 performs a similar function.

Display 234 may be a standard LCD device, or may employ an alternate technology. Display 234 is shielded by a protective window pane 232, which is similar in function but different in construction from the window pane 13 found in the prior art (see FIG. 1). In a preferred embodiment, window pane 232 is integrally formed with inner assembly chassis face plate 710, and delineated by a raised perimeter portion 233 (See, FIGS. 7–9 and the explanatory text below for more details). An opening (not shown) formed in primary cover 250 permits raised perimeter 233 to extend outwardly from chassis face plate 710.

Outer band 270 is an optional device that is both functional and decorative in nature. It is preferably made from an elastomeric material and extends continuously around mobile station 200. Outer band 270 may be any thickness, but preferably adds no more than ten millimeters to the overall width or thickness dimensions of mobile station 200. In the embodiment illustrated in FIG. 2, outer band 270 forms display opening 272 such that the raised perimeter 233 defining window pane 232 also extends through it. Outer band 270 also forms opening 274 so that function key 216 is accessible to the user even when outer band 270 is in place. Note that FIG. 2 illustrates a preferred location for outer band 270, but it could be placed in other locations along the length of mobile station 200 as well, with appropriately formed openings. In addition, it could also extend in a different orientation, such as from end to end, and depending on the shape and design of mobile station 200 itself, it may be desirable to do so. And although outer band 270 is preferably a continuous band of elastomeric material, it could also include a first end and a second end having fastening means such as a snap, tab and slit, button, fabric hook and eye, or zipper for connecting the ends when wrapped around mobile station 200. An isometric view of outer band 270 (only) is presented in FIG. 13.

In a preferred embodiment, tab 254 is formed at the bottom end 207 of cover 250 of mobile station 200. Tab 254 provides a means for grasping primary cover 250 during installation or de-installation for the purpose of stretching it along its length. Opening 255 formed in tab 254 may be included in order to make it easier to grasp or stretch, or for providing a convenient place to attach a lanyard or similar device. Note that in a preferred embodiment, primary cover 250 is dimensioned so as to fit snugly over the internal assembly. If the internal length dimension of cover 250 (see FIG. 5), for example, is slightly small than the external length dimension of the internal assembly 700, then a slight extension of cover 250 may be used to install the internal assembly, which will then be "grabbed" by cover 250 when it is released. With the disclosure presented here, it should be apparent to one skilled in the art to make suitable adjustments to the width and depth of the interior of cover 250 so as to contribute to a secure fit between cover 250 and internal assembly 700.

In a preferred embodiment, primary cover extends along the entire face of internal assembly 700 and partially along the sides and back, as well. Secondary cover 260 provides the back outer enclosure portion for mobile station 200. It extends along the portions of the internal assembly not covered by primary cover 250. Primary cover 250 and secondary (back) cover 260 meet at joint 265. In a particularly preferred embodiment, contact between secondary cover 260, which may be composed of a hard plastic and elastomeric primary cover 250 forms a seal at enclosure joint 265 sufficient to prevent penetration by water or small particulate matter and dust. For added integrity, a membrane may be used to cover speaker port 252 and microphone port 244 to such matter while still permitting the efficient transfer of sound. External power supply port 246 and headphone port 248 are electrical, not actual openings, but a protective cover (not shown) could also be provided to close them to foreign matter when not in use.

While it should be apparent that the design described above could be enhanced to provide a waterproof, dustproof enclosure sufficient to withstand pressures encountered at depth, the primary advantage of the enclosure of the present invention will obtain in keeping out moderate dust, rain, and casual water that come into contact with mobile station 200. Note also that water-resistance and dust-resistance are advantages of the present invention and not requirements (except where explicitly claimed).

Figure 3:
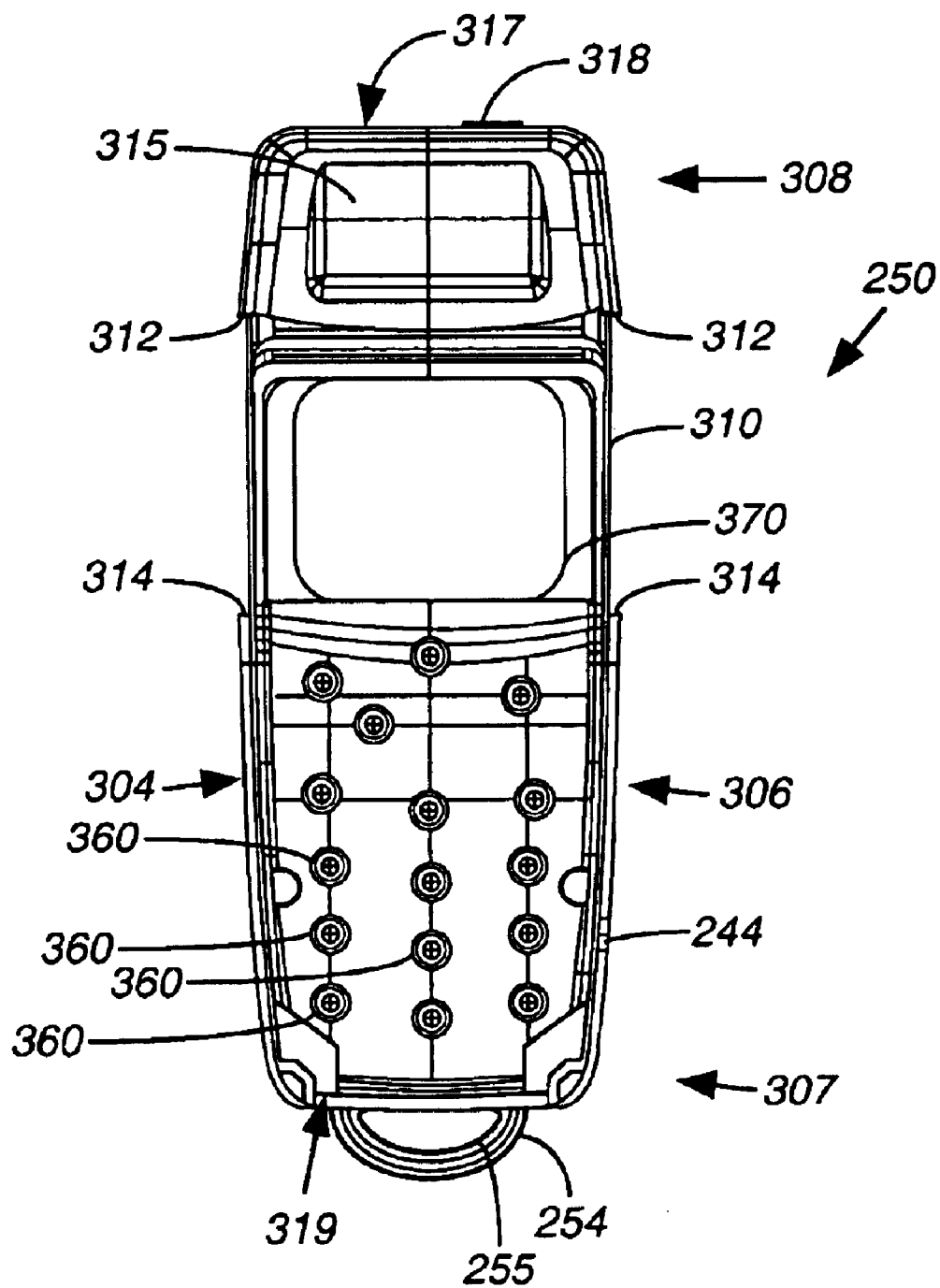
FIG. 3 is a rear exterior view of the primary cover of an enclosure according to an embodiment of the present invention.

FIG. 3 is a rear exterior view of the primary cover 250 of enclosure 201 according to an embodiment of the present invention. Note that FIGS. 2–13 illustrate essentially different aspects of the same embodiment; any variation between them is of no significance to describing the present invention. Components or features appearing in more than one Figure will be identified by the same reference number.

Returning to FIG. 3, primary cover 250 will, for convenience, be said to have a bottom 307 and a top 308, corresponding to the bottom 207 and top 208 of the assembled mobile station 200 shown in FIG. 2. Although the components described in connection with the present invention are by and large symmetrical about their longitudinal axis, a primary cover right sidewall 304 and left sidewall 306 will, from time to time, be referred to, the directions themselves being determined when viewed from the front, or face of mobile station 200. Microphone port 244, for example, is in FIG. 3 visible in the left side 306 of cover 250, just as it was in FIG. 2. The display opening (window) 372 in primary cover 250 is visible in this view, but not in FIG. 2, however, because outer band 270 is not shown in FIG. 3. Likewise, a shallow recess 310 formed in protective cover 250 and defined by upper edge 312 and lower edge 314, into which outer band 270 is received as mobile station 200 is assembled. Recess 310 is not required, though it is preferred as a means for retaining outer band 270 in position by allowing it to relax slightly from the extension necessary to work it into place.

In the illustrated embodiment, back wall 315 of primary cover 250 extends from right side 304 to left side 306 in order to form a pocket 385 (shown in FIG. 5) for receiving the mobile station 200 internal assembly (not shown in FIG. 2). Preferably, back wall 315 is continuously formed with the side walls and top wall 317, which in turn is continuously formed with the front wall 209. While in this embodiment, the pocket 385 is thus continuously formed. In another embodiment, various openings may be provided in the area forming the pocket in order to accommodate peripheral-equipment connections to allow trapped air to escape, or for other design considerations. In FIG. 3, power key 318 is visible as a raised feature formed on top wall 317. As with the other keys, power key 318 is positioned so that when the mobile station is assembled it can be used to activate a corresponding switch present on the mobile station internals.

Also visible in FIG. 3 are key pegs 360 (some, though not all, being designated by this reference number; the remainder of similarly-appearing structures are key pegs as well). Key pegs 360 form the means, in this embodiment, whereby user-induced key movement is translated to the actual switch (not shown) on the internal assembly. Key pegs 360 may be integrally formed with primary cover 250, but may also be attached by other means (for example, an adhesive) as well. By the same token, they may be made of an elastomeric material, possibly reinforced in some way, but could also have a different composition. As previously eluded to, key pegs could also extend from keys that are separate from primary cover 250, but positioned to align with primary-cover openings through which the keys may be accessed.

Figure 4:
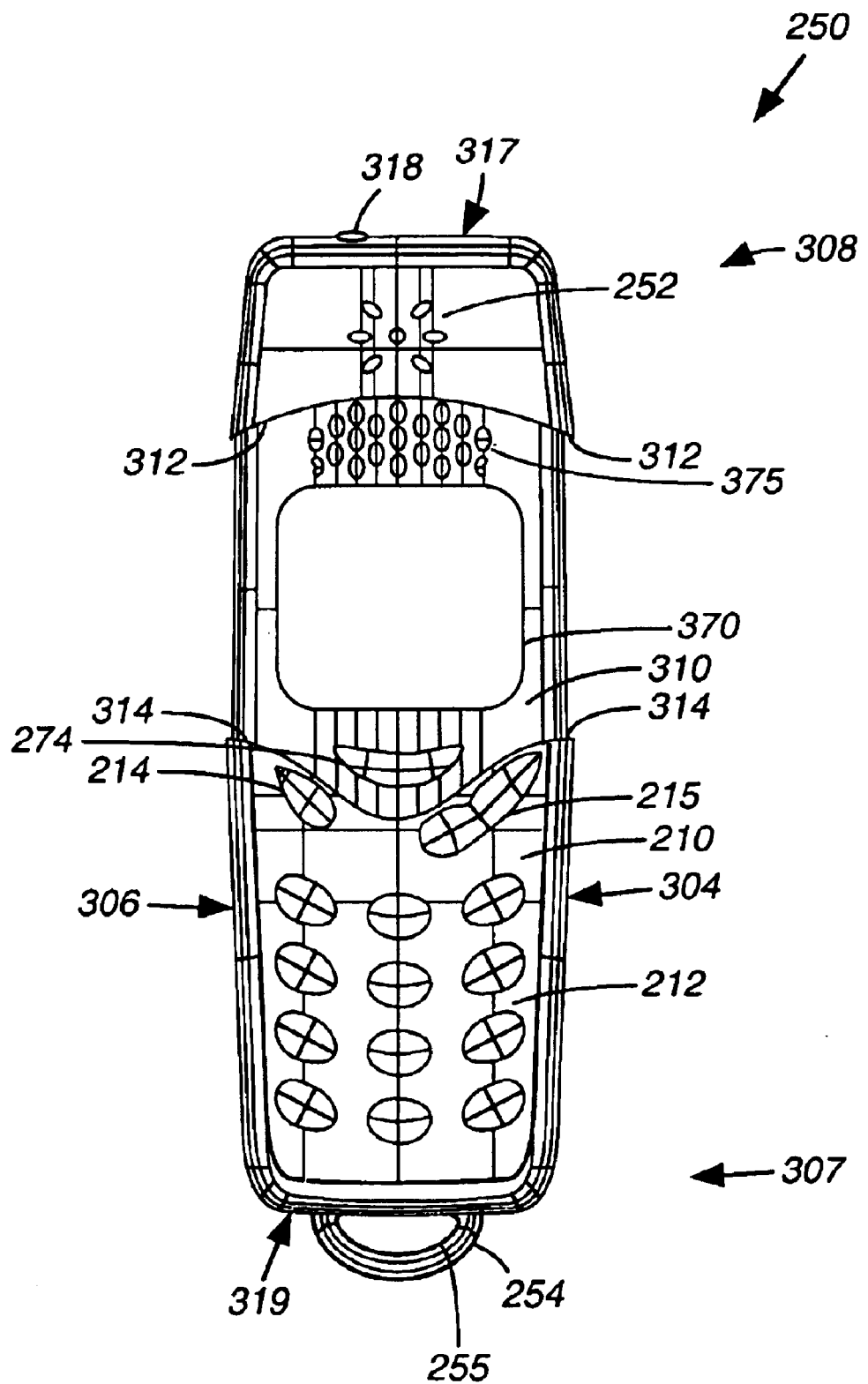
FIG. 4 is a front exterior view of the primary cover of an enclosure according to an embodiment of the present invention.

FIG. 4 is a front exterior view of primary cover 250 of enclosure 201 according to an embodiment of the present invention. In this view, the reverse of FIG. 3, the face 209 of front wall 210 of primary cover 250 is visible, and right side wall 304 and left side wall 306 appear respectively, on the right and left side of the drawing. Outer band 270 is not shown, and so recess 310, defined by upper edge 312 and lower edge 314 is visible in this view. Note that in the illustrated embodiment, recess 310 continues across the face 209 of primary cover 250. Whether or not the recess 310 continues across face 209, however, it is preferred that the mobile station 200 be configured so that it may be comfortably and conveniently used with or without optional outer band 270 (recognizing that some designs may require its installation). The absence of outer band 270 in FIG. 4 also reveals a dimpled area 375 extending across a portion of the face 210 of protective cover 250, in this embodiment lying between display window 370 and upper edge 312, and therefore within recess 310. The dimpled area 375 includes a plurality of concave (or similarly shaped) dimples, and is believed to contribute desirable shock-absorbing characteristics to primary cover 250. The location of this feature may shift, expand, or contract, and its size and location in FIG. 4 is only illustrative.

Figure 5:
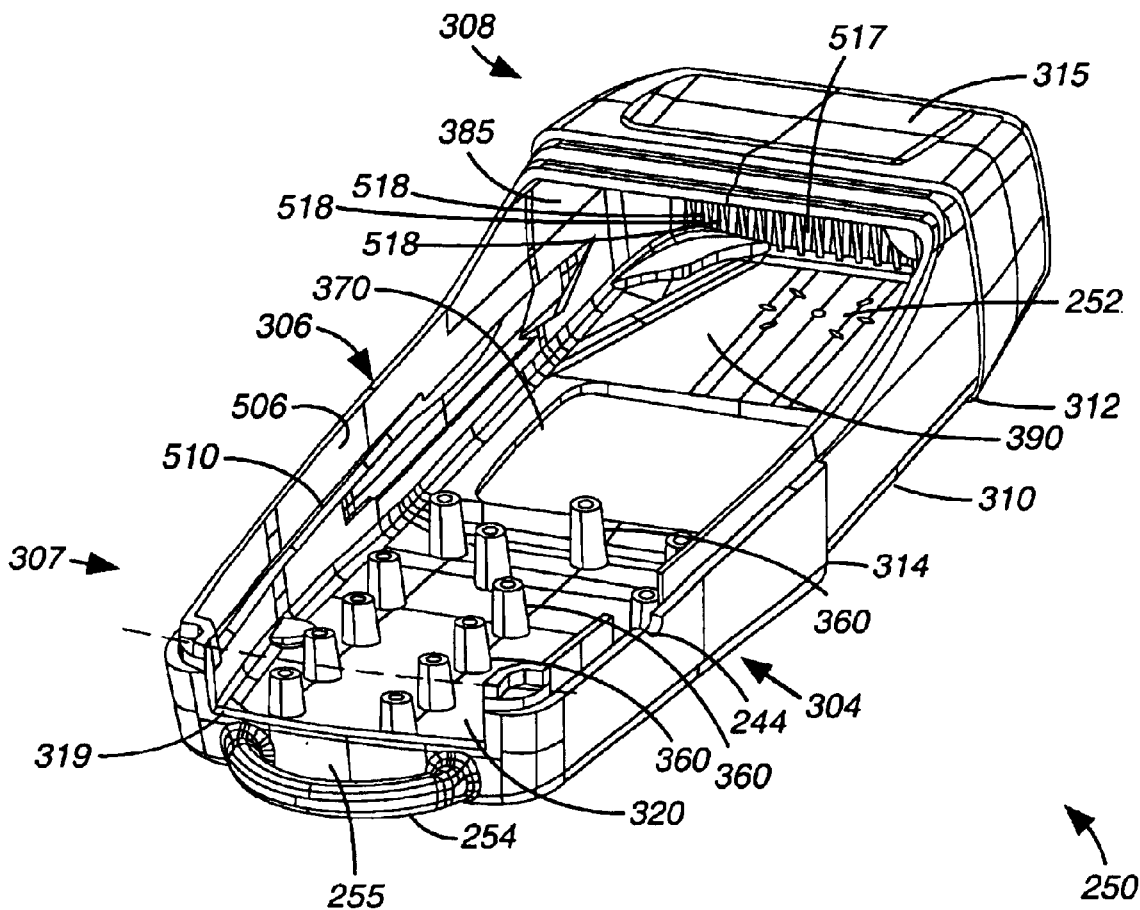
FIG. 5 is a rear quarter isometric view of the primary cover of an enclosure according to an embodiment of the present invention.

FIG. 5 is a rear-quarter isometric view of primary cover 250 of enclosure 201. In this view it is more clearly shown that primary cover 250 forms a recess 390 generally bounded by front wall 210, top wall 317, bottom wall 319, and right side wall 306 and left side wall 304. Back wall 315, which extends only part way along the length of primary cover 250, also thereby defines a boundary of recess 390, as well as forming pocket 385 (pocket 385 being considered a portion of recess 390). In FIG. 5 also can clearly be seen key pegs 360 extending inwardly from the interior face of front wall 210. Note that in the illustrated embodiment key pegs 360 are tapered and somewhat tubular in shape, an advantage in the molding process, but they may assume any other suitable shape as well.

Bottom wall 319 in this embodiment forms a cut-out section 320 through which power port 246 and headphone port 248 will be accessible when internal assembly 700 is received into recess 390. Preferably, however, cut out 320 does not extend the entire length of bottom wall 319 so as to provide additional interior surface area with which to contact, and thereby help retain, installed internal assembly 700 (shown in FIG. 7).

Also visible in the view of FIG. 5 is groove 510 formed along the interior face 506 of right side wall 306. Groove 510 need not extend the entire length of interior face 506, and generally will not extend all the way through its thickness either. A similar groove is formed in the interior face (not shown in FIG. 5) of left side wall 304 as well. The grooves are formed to receive a corresponding extension tab (not shown) formed on internal assembly 700. The groove is not entered from one end and traversed, but rather side walls 304 and 306 are forced outward by the corresponding extension tabs during installation of the internal assembly, and the extension and grooves are positioned such that they are aligned when internal assembly 700 is fully in place. By elastomeric rebound the communication is then accomplished. Note that the extension tabs and groove combinations are only one retaining means, and there may be others.

Note that as used herein the "retaining means" refers to any structure or combination of structures that assist in maintaining the installed status of the internal assembly 700. The aforementioned tongue and groove combination are such a means, and effectively the combination of walls forming pocket 385 are another. Also, a retaining means is the combination of top, bottom, and side walls constructed so that the dimensions of recess 390 are, along one or more axes, are smaller than the corresponding dimension of the internal assembly is yet another.

Figure 6:
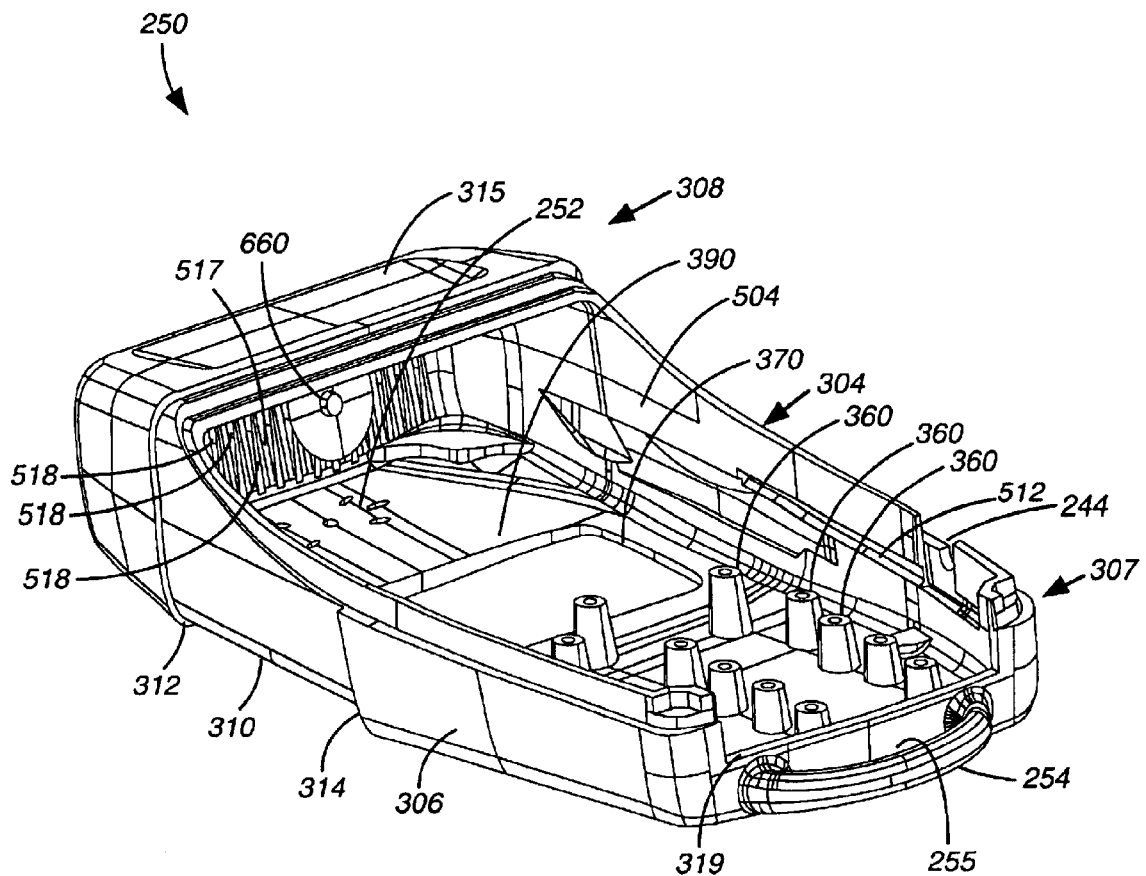
FIG. 6 is a second rear quarter isometric view of the primary cover of an enclosure according to an embodiment of the present invention.

FIG. 6 is a second rear-quarter isometric view of the primary cover 250 of enclosure 200 according to an embodiment of the present invention. Although similar to FIG. 5, visible in this view is power key peg 660 that extends inwardly from the interior 517 of top wall 317 of primary cover 250. Power key peg 660 translates inward movement imposed by the user on power key 318 to a power switch (not shown in FIG. 6) on the internal assembly 700 of the mobile station 200. Note that in the illustrated embodiment, ribs 518 on the interior 517 of top wall are absent in the vicinity of power key peg 660 so as not to interfere with its operation. Also shown in FIG. 6 is groove 512 formed on the interior surface 506 of left wall 304 to receive extension tab 755 (shown in FIG. 7) of internal assembly 700.

The "internal assembly" (or simply "internals") as used herein describes a collection of components that include the pointed circuit board (PCB) having mounted on it many, if not virtually all of the electronic components of mobile station 200. (Mobile stations typically, though not necessarily, have a single PCB.) These electric components typically include the microphone, speaker, and LCD or other display. The internal assembly also usually includes a set of inner covers or an inner enclose for enclosing the PCB and electrical components. The inner assembly is often almost completely enclosed and unseen by the user in normal operations. Some portions of the inner assembly, however, may form part of the mobile station's exterior, for example at the location of power port 246 and headphone port 248 as shown in FIG. 2. As used in connection with describing the present invention, however, there is no precise requirement for composition of the internal assembly, except where a particular feature is discussed in connection with a described embodiment.

Figure 7:
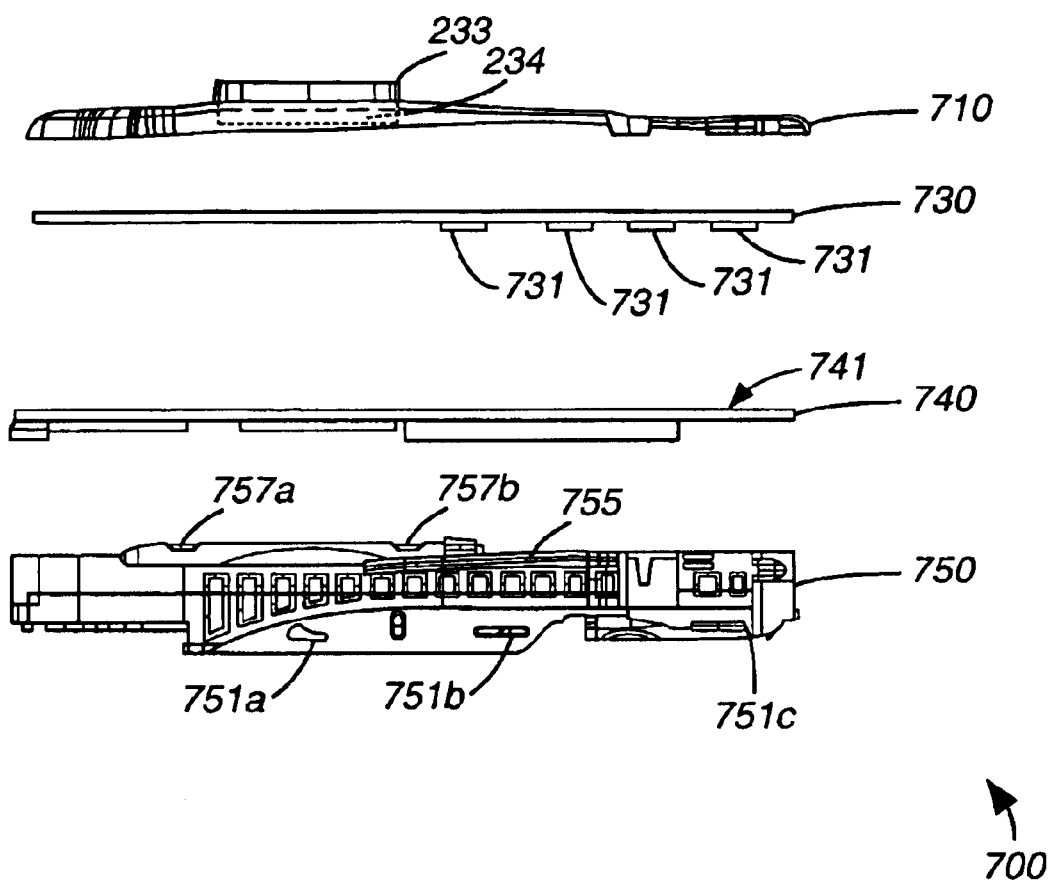
FIG. 7 is an exploded side view of an exemplary mobile station inner assembly that may be used according to an embodiment of the present invention.

FIG. 7 is an exploded side view of an exemplary mobile station internal assembly 700, such as one that may be used in accordance with an embodiment of the present invention. As mentioned above, except where explicitly pointed out, there are no specific requirements for construction of the internal assembly; it is a general term used to refer to the mobile stations internals, which are substantially if not completed enclosed in accordance with practicing the present invention. In the illustrated embodiment, internal assembly 700 includes PCB 740, upon which are mounted various of the electrical components that perform the telecommunication function fund of the mobile station 200. Mounted on the top 741 of PCB 740 will typically be found a plurality of switch-contact pairs (not shown) such that the switch is closed by a third contact coming into contact with both contacts of a switch-contact pair. For example, a number of such third contacts 731 are shown as mounted on the underside of contact sheet 730. Contact sheet 730, in this embodiment, is constructed of a thin sheet of plastic or similar material, and acts not only to retain contacts 731 but to act as a barrier to keep dust, water droplets, and other deleterious foreign matter away from PCB 740. Typically, when in an assembled configuration PCB 740 and contact sheet 730 cooperate such that the switches formed by contacts 731 and the contact pairs mounted on PCB 740 are normally open, and may be closed by application of a force driving them together. In accordance with the embodiment of primary cover 250 (shown, e.g. in FIG. 6), this force would be present upon the user pressing a key, whereupon the key movement is translated through the corresponding key peg to contact sheet 730. PCB 740 and contact sheet 730 are held in proper relation by chassis body 750 and chassis face-plate 710. Chassis body 750 may be configured so as to in effect contain PCB 740, and likely houses other mobile-station components as well, such as the mobile station's microphone and battery. The chassis body 750 is constructed of a relatively rigid material and also contributes significantly to the mobile station's structural strength. Because of its relative size and rigidity, it also both cooperates with and contains some of the structural features necessary to hold primary cover 250 reliably in place. Chassis face plate 710 is also preferably constructed of a relatively rigid material and when the mobile station is assembled, fastened to chassis body 750 using a plurality of screws or some other fastening means.

Face plate 710 will preferably contain the speaker (not shown) and LCD 234 (approximate location shown by broken line). In a preferred embodiment, face plate 710 and chassis body 750 are fastened together with PCB 740 and contact sheet 730 between them, although alternately they may simply be operably positioned with respect to each other and then installed into cover 250, which will then serve to maintain this relationship.

Figure 8:
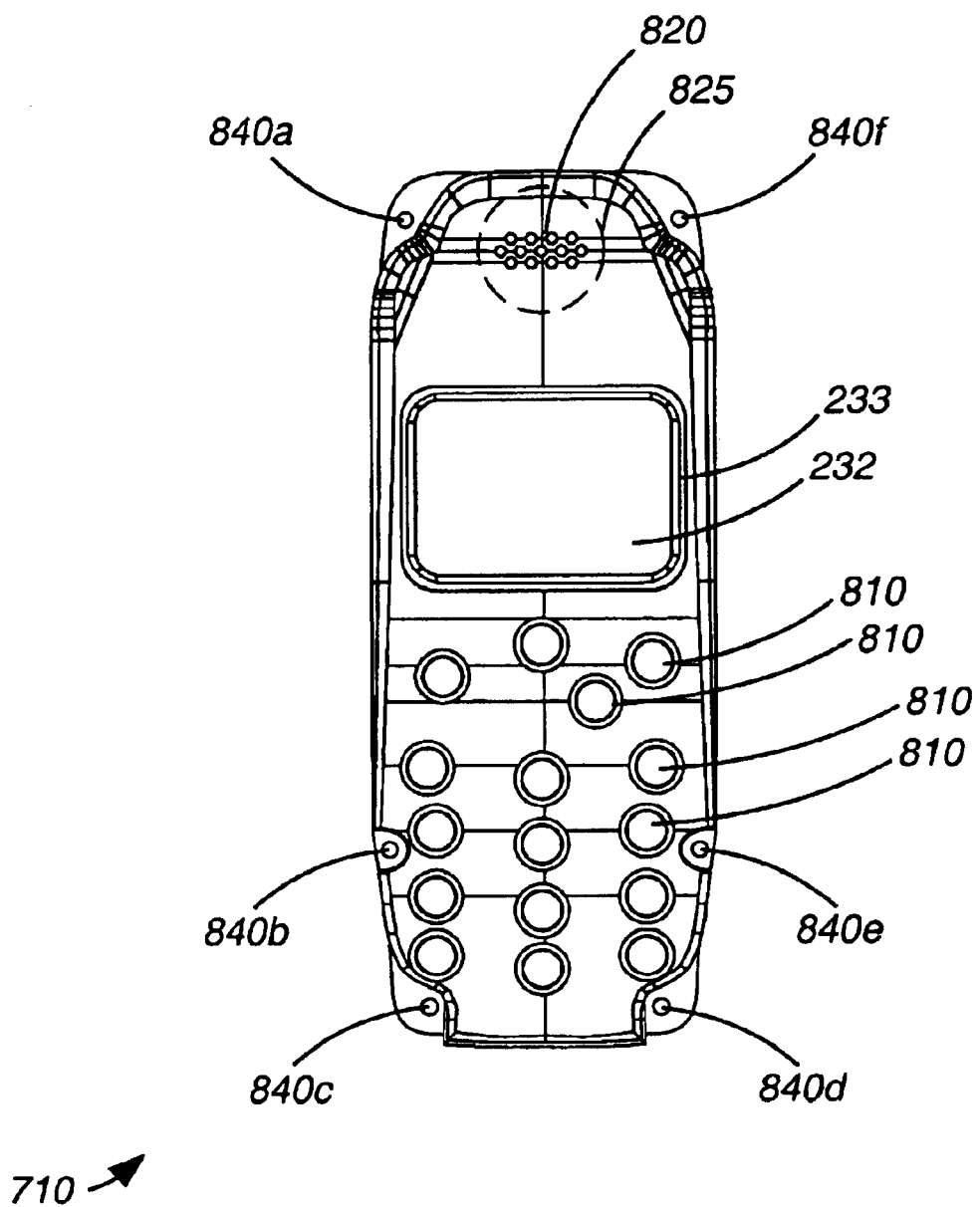
FIG. 8 is a front plan view of a chassis face plate of an enclosure according to an embodiment of the present invention.

FIG. 8 is a front plan view of a chassis face plate 710 in accordance with an embodiment of the present invention. Chassis face plate 710 forms a plurality of key-peg channels 810 positioned to receive key pegs 360 when primary cover 250 is assembled onto internal assembly 700. The key-peg channels 810 are sufficient in size to allow the keypegs 360 to move freely in and out, but preferably small enough in size to ensure that each key peg 360 strikes the appropriate location on contact sheet 730, that is, the location corresponding to a contact 731. Although all of the key-peg channels 360 are shown in the same size in FIG. 8, they may assume any size or shape consistent with their function.

Also visible in FIG. 8 is display window pane 232 surrounded by raised window perimeter 233. The pane and the rim are preferably integrally formed with the remainder of face plate 710, providing structural strength and resistance to penetration by unwanted foreign matter. The plurality of openings making up face-plate speaker port 820 are positioned over the location of speaker 825, and, when finally assembled, will lie beneath primary cover speaker port 252, this arrangement permitting sound emanating from speaker 825 to pass to the user in faithful form (again, other arrangements are possible.)

Figure 9:
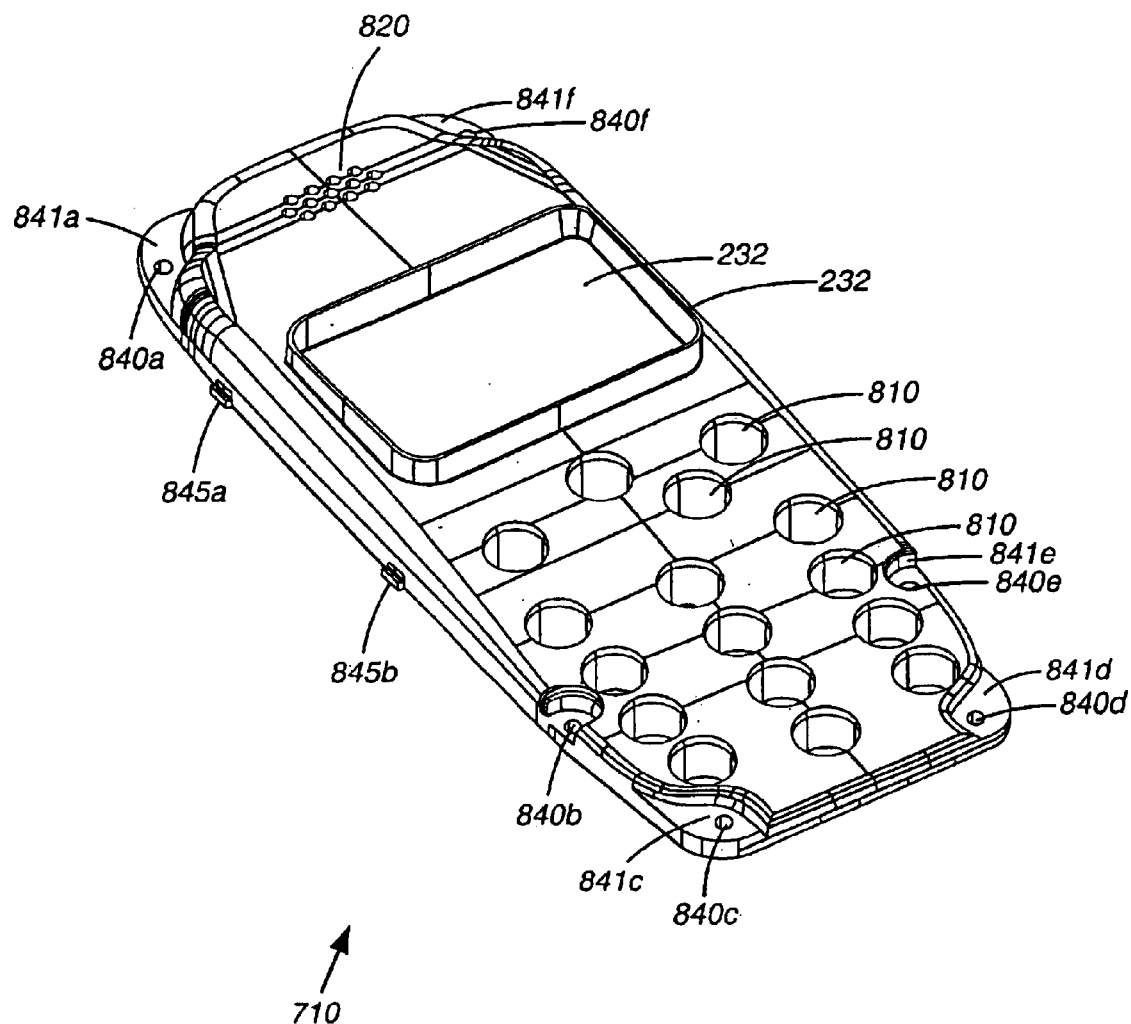
FIG. 9 is a front isometric view of the chassis face plate of FIG. 8.

Fastener openings 840a through 840f are formed near the perimeter of face plate 710 and align with threaded openings on chassis body 750 to fasten the two components together when assembled FIG. 9 is an isometric view of a chassis face plate 710 according to an embodiment of the present invention. Although not drawn strictly to scale, an approximation of the relative extension of window rim 233 from face plate 710 can be seen in this view. In general preferably extends sufficiently to pass through both window—in primary cover 250 and window—formed in outer band 270. As window rim 233 is integrally formed as part of face plate 710 and made from a relatively stiffer plastic than those two enclosing components, raised perimeter 233 may assist in aligning them during installation and retaining them once the mobile station 200 is assembled. In this view it can also clearly be seen that fastener openings 840a through 840f are formed within recesses 841a through 841f, also formed in face plate 710. While this configuration has an aesthetically pleasing appearance, it also helps to ensure that the six fasteners used to secure chassis face plate 710 to chassis body 750 do not interfere with assembly of the internal assembly 700 into recess 390 of primary cover 250. In addition, it keeps the presumably metal fasteners from wearing into the material of primary cover 250, perhaps causing premature failure.

In this isometric view, it is also possible to see that in the illustrated embodiment face plate 710 has sufficient thickness so as to permit a recess to be formed on its reverse, meaning that face plate 710 does not in an assembled condition come into contact with contact sheet 730 except at its perimeter (or elsewhere as desired). This may help, among other advantages, to prevent inadvertent pressure against the areas in the vicinity of contacts 731, and in that was prevent accidentally closing, or on the other hand hindering the normal closing when activated, of any of the switches. Where the recess under face plate 710 is present, however, key peg channels 830 may be formed so as to extend into the recess if necessary to help guide the key pegs to their target location.

Retaining tabs 845a and 845b (along with similar tabs, not shown, on the opposite side of face plate 710) will be received into corresponding slots 757a and 757b (shown in FIG. 7) formed in chassis body 750 when the face plate 710 is installed. In this way proper alignment may be made more certain, and the face plate 710 will not simply slide or fall off when the fasteners are not present. Note that retaining tabs 845a and 845b, however, are optional. On the other hand, they may also be used alone, that is, without any other fasteners whatsoever. The desired number of retaining tabs present on face plate 710 will of course vary according the particular use made of them. In an alternate embodiment (not shown), tabs on chassis body 750 may be formed so as to engage corresponding slots or grooves on faceplate 10.

Figure 10:
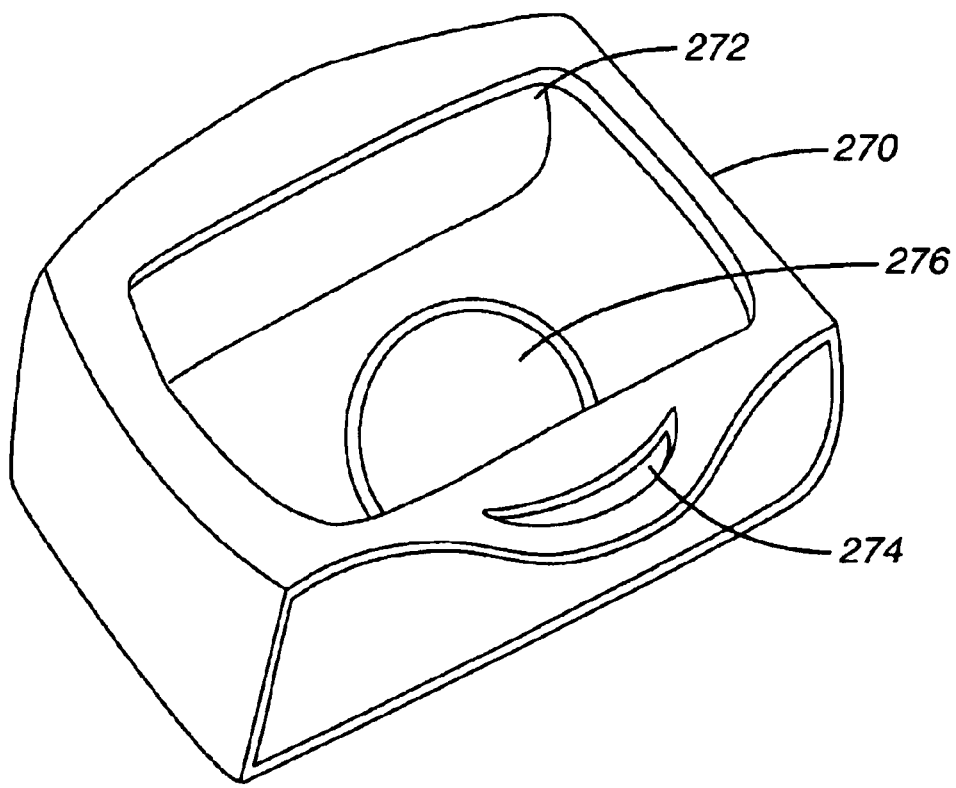
FIG. 10 is a front isometric view of the outer band according to an embodiment of the present invention.

FIG. 10 is an isometric view of the outer band 270, which is shown in place on mobile phone 200 in FIG. 2. Display opening 272 and function key opening 274 are clearly visible in this view, as is back-tab recess 276. When in place, back-tab recess 276 receives back tab 262 extending from secondary (back) cover 260. In this way outer band 270 is retained in place (as shown in FIG. 2) not only by the need to slightly stretch the band for removal and to overcome friction between outer band 270 and primary cover 250, but by the display window rim 233, function key 216, and back tab 262, which extend outward into the respective recesses formed to receive them. At the same time, outer band 270 may help to retain in their proper assembled configuration primary cover 250 and secondary cover 260, and thereby contributes to the dust-resistant and water-resistant nature of the enclosure of the present invention. Outer band 270, being preferably made of an elastomeric material, also provides greater shock protection for the mobile station 200 in the critical area adjacent to LCD 234. Finally, outer band 270 will be relatively inexpensive and easy to replace, allowing for the sale of a variety of colors by which users may customize the appearance of their mobile station, easily changing it to suit the occasion.

Figure 11:
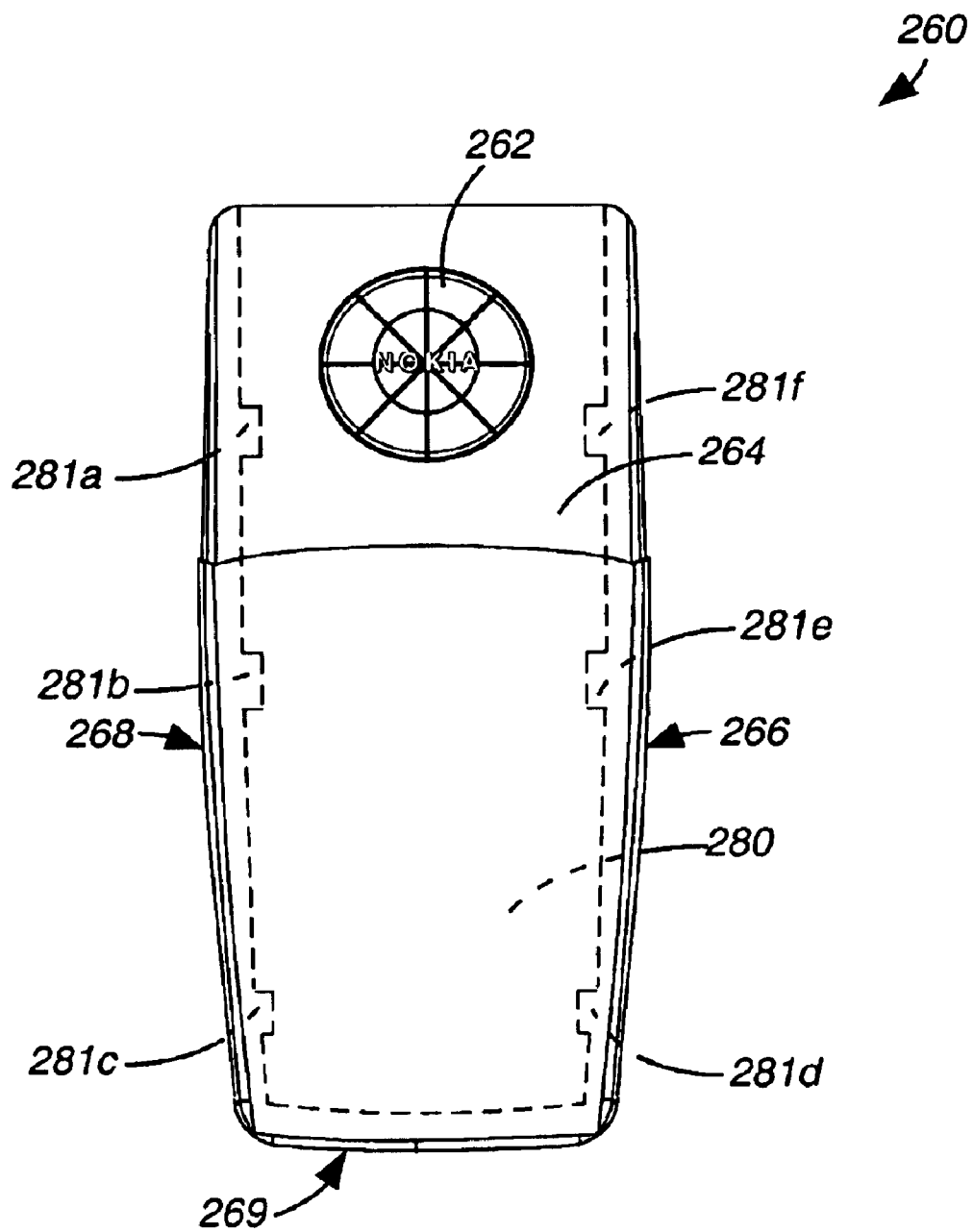
FIG. 11 is a rear view of a secondary cover of an enclosure according to an embodiment of the present invention.
Figure 12:
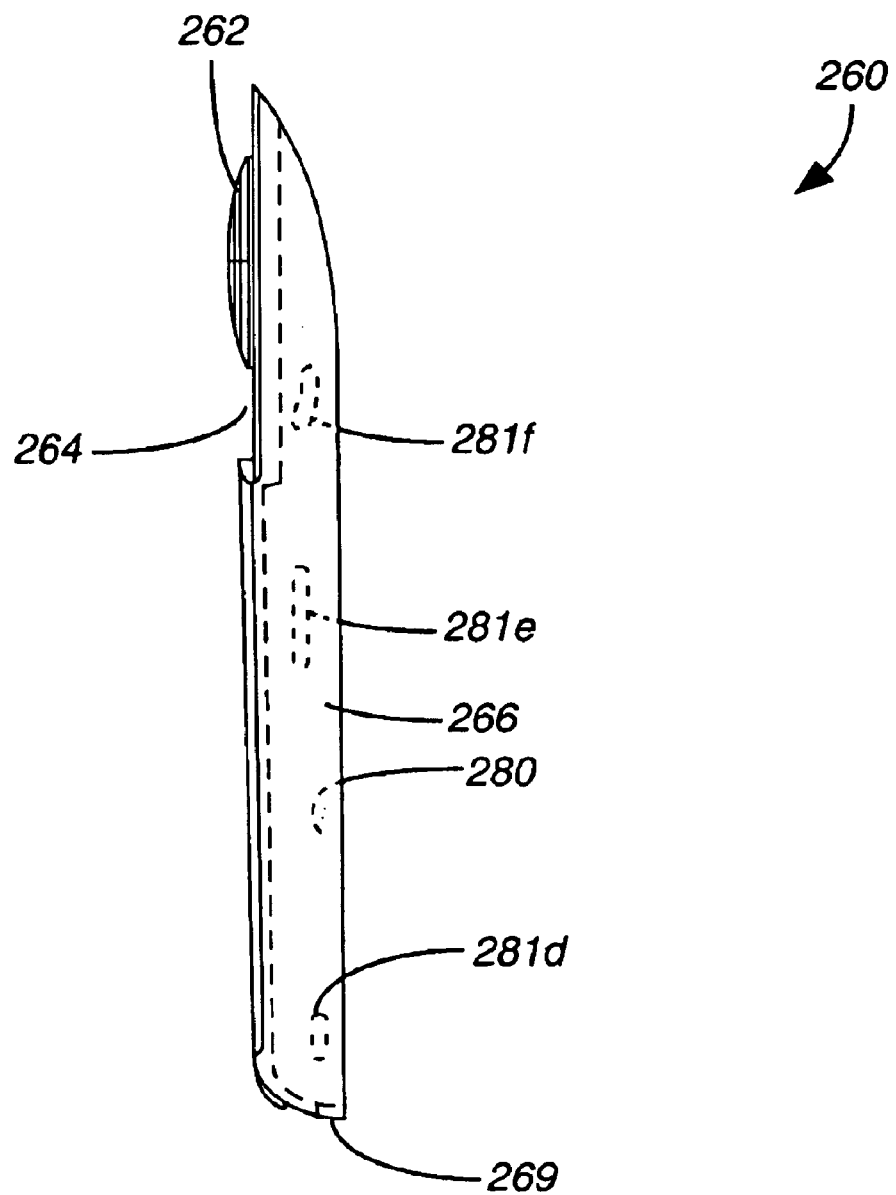
FIG. 12 is a side view of a secondary (back) cover of an enclosure according to an embodiment of the present invention.

FIG. 11 is a plan view of secondary cover 260 as viewed from the rear of mobile station 200 of FIG. 2. Secondary cover 262 is preferably made of a hard plastic, providing a relatively stiff cover for the battery compartment formed in the inner assembly 700 (not shown) as well as serving as the back cover for mobile station 200. Back tab 262, previously discussed, is shown positioned near the center of recess 264. Recess 264, analogous to recess 310 of primary cover 250, is formed in secondary cover 260 to receive outer band 270. As should be apparent, when outer band 270 is used, it fits together with primary cover 250 and secondary cover 260 in such a way as to help maintain the mobile station 200 in its assembled configuration. Outer band 270 is optional, however, and where it is not to be used it may be desirable to eliminate both back tab 262 and recess 264. As can be seen from FIGS. 11 and 12, secondary cover preferably forms a recess 280 that receives internal assembly 700 when the mobile station 200 is assembled. Three sides of recess 280 are formed by left side wall 266, right side wall 268, and bottom wall 269.

Extending inwardly into recess 280 from the side walls are tabs 281a through 281f, spaced apart from each other and located approximately one-half way into the recess measured along the width of the side walls. Tabs 281a through 281f are arranged thus to engage corresponding structures on the exterior wall of the chassis body 750 of inner assembly 700, for example the tabs 751a, 751b, and 751c shown in FIG. 7 (as well a similar set of tabs on the opposite side of chassis body 750). The secondary cover 260 may be removed and reinstalled with some frequency even during normal use because it serves as the battery cover. (In this embodiment, the battery is stored in a compartment formed in chassis body 750 but not shown in the drawings.) For stability and convenience, in the illustrated embodiment the secondary cover 260 is installed by properly orienting it and then positioning it proximate the mobile station bottom end 207, then sliding it toward the mobile station top end 208 so that the tabs of the secondary cover 260 are disposed adjacent but interior to the tabs extending outward from chassis body 750. The hard plastic secondary cover 260 flexes slightly (that is, deforms elastically) during the sliding installation maneuver, and is so held to provide a removal-resisting force that holds secondary cover 260 in place. When removal is desired, this removal-resisting force is overcome by applying pressure to the back of the secondary cover 260 to again slightly flex it and then allow it to slide out in the direction opposite that which it was installed. Note that this embodiment is exemplary and not limiting; armed with this disclosure one of ordinary skill will be able to devise other cooperative configurations to hold the secondary cover 260 in place on mobile station 200.

Figure 13:
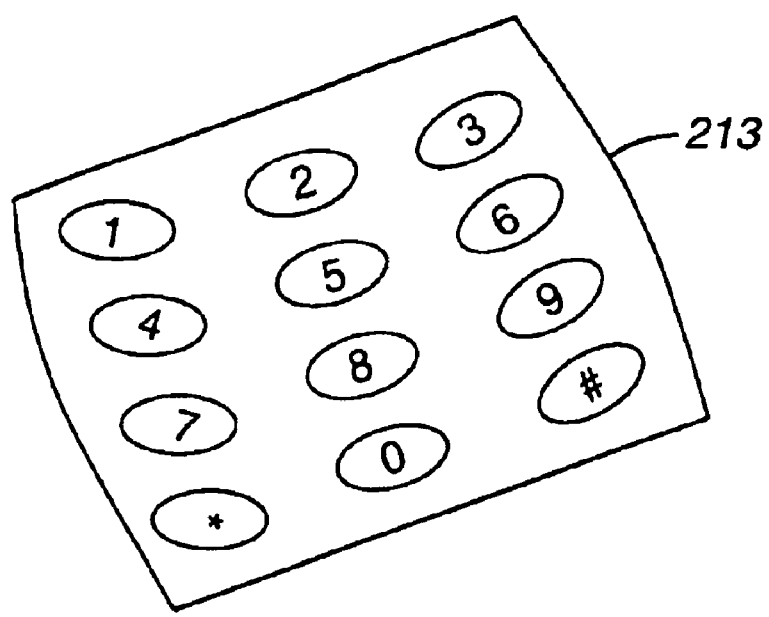
FIG. 13 is an illustration of an exemplary print template used for marking the alphanumeric keys of the primary cover according to an embodiment of the present invention showing surface detail only.

FIG. 13 illustrates a print template 213 that may be used for marking the alphanumeric keys of the primary cover 250 in accordance with an embodiment of the present invention. (Print template is also delineated by a broken line in FIG. 2.) Because primary cover 250 is molded, the keys may be marked using a pre-printed plastic template bearing the desired markings. Print template then may be, for example, inserted into the mold at the same time the primary cover 250 is being formed, resulting in virtually indelible key markings. A polycarbonate film such as Lexan® is suitable for forming the print template 213. Although the illustrated embodiment uses the print template 213 for the alphanumeric keys, it may, of course, be used to mark the others as well. In addition, such templates may be used to add trademarks, model names, instructions, and any other words or symbols—whether on a key or otherwise. Naturally, conventional methods of imprinting may be used, as well.

Finally, note that the description above provides exemplary and preferred embodiments for implementing the present invention. The scope of the invention, however, should not necessarily be limited by this description. The scope of the present invention is defined by the following claims:

What is claimed is:

1. An enclosure for a mobile station having an internal assembly including a display, comprising:

an elastomeric cover forming an internal-assembly recess for receiving the internal assembly, said elastomeric cover forming a plurality of key pegs extending into the recess for actuating switches present on the internal-assembly; the elastomeric cover forming a band recess for receiving an outer band;

an outer band separate from the elastomeric cover for encompassing the elastomeric cover and the internal assembly, the band forming an opening through which the display may be viewed;

wherein the elastomeric cover comprises an internal-assembly retaining structure that includes at least one retention recess for receiving a corresponding outward-extending structure on the internal assembly.

2. The enclosure of claim 1, wherein the elastomeric cover forms a window through which the mobile-station display may be viewed when the cover receives the internal assembly.

3. The enclosure of claim 1, wherein the elastomeric cover comprises a plurality of internal-assembly retaining structures.

4. The enclosure of claim 1, wherein the elastomeric cover comprises first side wall and a second side wall, each having an interior surface, and wherein the at least one retention recess is formed on the interior surface of the first side wall.

5. The enclosure of claim 1, wherein the internal-assembly recess is formed at least in part by a first side wall and a second side wall, and a front wall integrally formed with the first and second side walls.

6. The enclosure of claim 5, wherein the internal-assembly recess is formed at least in part by a back wall.

7. The enclosure of claim 5, wherein the internal-assembly recess is formed at least in part by a top wall.

8. The enclosure of claim 7, wherein the top wall comprises an interior surface having a plurality of ribs.

9. The enclosure of claim 5, wherein the internal-assembly recess is formed at least in part by a bottom wall.

10. The enclosure of claim 9, wherein the bottom wall has an interior surface and an exterior surface, and further comprising an assembly tab extending outwardly from the mobile station.

11. The enclosure of claim 1, wherein the elastomeric cover comprises a front wall having an exterior surface, and wherein the front-wall exterior surface forms a recess for receiving a band.

12. The enclosure of claim 11, wherein at least a portion of the exterior surface features a dimpled texture.

13. The enclosure of claim 11, wherein the cover portion corresponding to at least one of the plurality of key pegs is visibly marked so as to indicate to a user a function associated with the switch activatable by the key peg.

14. The enclosure of claim 13, wherein the visible marking is made using a pre-printed film that is bonded to the cover.

15. The enclosure of claim 11, wherein the cover portion corresponding to at least one of the plurality of key pegs includes a raised exterior portion to indicate to a user the location of the cover to press.

16. The enclosure of claim 1, further comprising a back cover for covering a portion of the interior-assembly surface.

17. The enclosure of claim 16, wherein the back cover is removably attachable to the interior assembly.

18. The enclosure of claim 16, wherein the back cover forms a recess for receiving the outer band.

19. The enclosure of claim 16, wherein the outer band forms an opening for receiving a structural portion extending from the back cover.

* * * * *